United States Patent
Camello et al.

(10) Patent No.: US 9,900,037 B2
(45) Date of Patent: Feb. 20, 2018

(54) GPS SELECTOR FROM A DIVERSITY/MIMO ANTENNA CABLE

(71) Applicant: Continental Automotive Systems, Inc., Auburn Hills, MI (US)

(72) Inventors: Bob C Camello, Vernon Hills, IL (US); Jianming Zhang, Buffalo Grove, IL (US); Benjamin Pokorny, Elk Grove Village, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/668,242

(22) Filed: Mar. 25, 2015

(65) Prior Publication Data

US 2016/0285491 A1 Sep. 29, 2016

(51) Int. Cl.
| | |
|---|---|
| *H04B 7/08* | (2006.01) |
| *H04B 1/3822* | (2015.01) |
| *H04B 1/401* | (2015.01) |
| *H04B 1/3805* | (2015.01) |
| *H04B 7/12* | (2006.01) |

(52) U.S. Cl.
CPC ......... *H04B 1/3822* (2013.01); *H04B 1/3805* (2013.01); *H04B 1/401* (2013.01)

(58) Field of Classification Search
CPC .......... H04B 1/18; H04B 1/48; H04B 1/3822; H04B 1/401; H04B 1/0064; H04B 1/0067; H04B 1/0082
USPC .................................................. 455/132, 133
See application file for complete search history.

(56) References Cited

U.S. PATENT DOCUMENTS

| 7,376,440 | B2* | 5/2008 | Forrester | ............... | H04B 1/406 |
| | | | | | 455/324 |
| 8,824,986 | B2* | 9/2014 | Gekat | .................... | G01S 7/288 |
| | | | | | 455/123 |
| 2006/0044196 | A1* | 3/2006 | Grant | .................. | H01Q 1/3275 |
| | | | | | 343/713 |
| 2013/0009849 | A1* | 1/2013 | Ohguchi | ............... | H01Q 1/243 |
| | | | | | 343/893 |

FOREIGN PATENT DOCUMENTS

| JP | 2004248120 A | 9/2004 |
| KR | 101496178 B | 2/2015 |
| WO | 2009/008637 A1 | 1/2009 |

OTHER PUBLICATIONS

Search Report dated Oct. 1, 2015, from corresponding GB Patent Application No. GB1507257.2.

* cited by examiner

*Primary Examiner* — Lee Nguyen

(57) ABSTRACT

A single transmission line couples multiple different antennas to corresponding radios using a low-loss signal selector made from a directional radio frequency coupler and a bandpass filter. A combiner receives signals from the antennas and combines those signals onto the one transmission line. The multiple, different-frequency signals on the transmission line are provided to a directional coupler having two outputs. One of the outputs from the directional coupler is routed to a first band pass filter having a pass band corresponding to a radio frequency required by a particular radio.

9 Claims, 2 Drawing Sheets

GPS SELECTOR FROM A DIVERSITY/MIMO ANTENNA CABLE

BACKGROUND

Most vehicles are manufactured with radios that receive the commercial AM and FM bands. Some vehicles are also manufactured with cellular telephone transceivers and navigation systems that include global positioning system receivers. Radio devices work best when they are provided with antennas that are sized, shaped and configured for the particular radio frequency band in which the devices operates. When a vehicle is provided with multiple radio devices that each require a correspondingly different antenna, coupling the multiple antennas to the multiple radio devices requires a corresponding multiple number of transmission lines. Reducing the number of transmission lines in a vehicle to one would reduce cost, reduce assembly time, reduce weight and increase the reliability of the vehicle. A method and apparatus for eliminating the need for a transmission line between each radio device and a corresponding antenna would be an improvement over the prior art.

DETAILED DESCRIPTION

Figure 1:
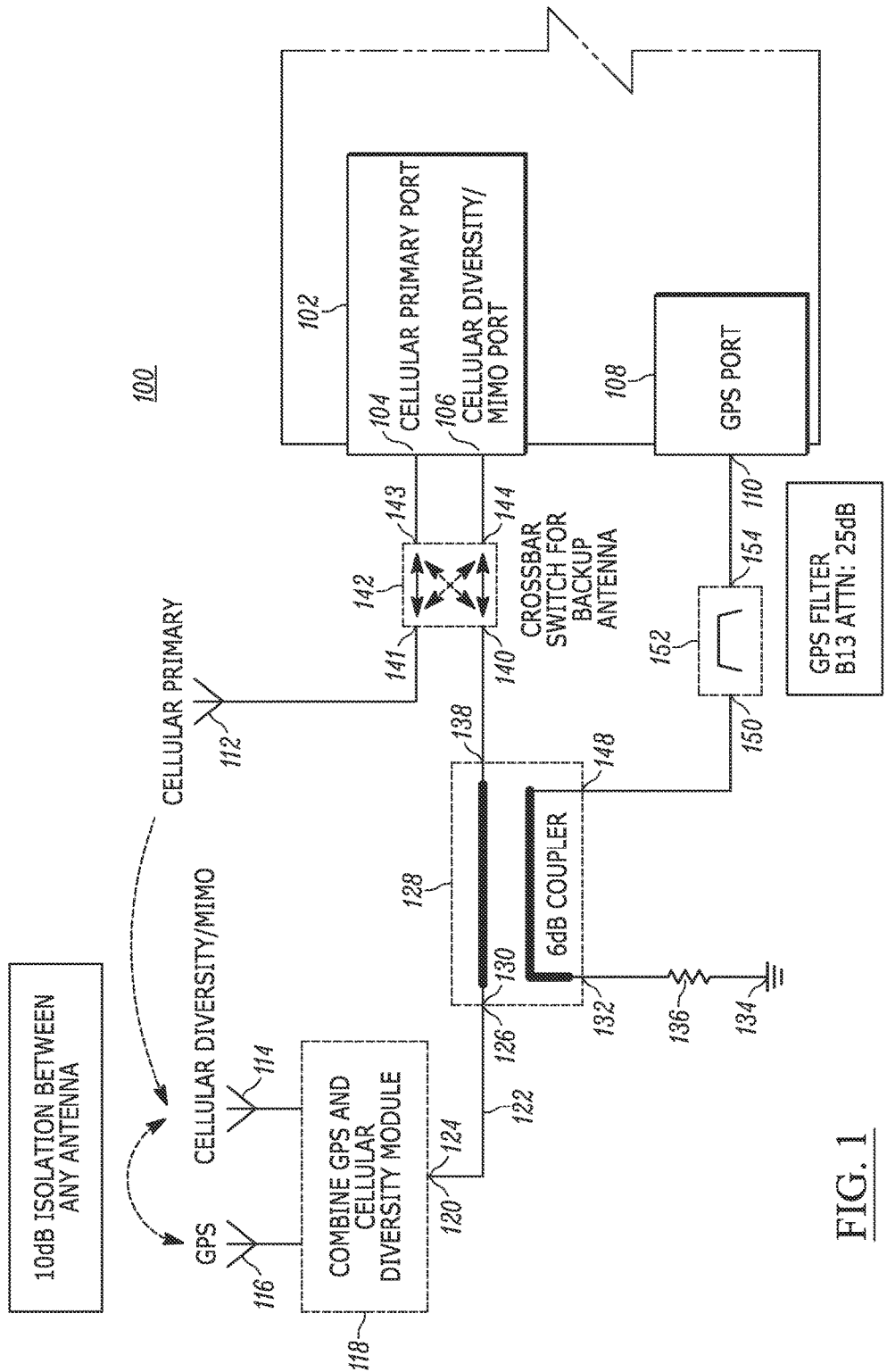
FIG. 1 is a block diagram of a radio system for a motor vehicle, the system including a low-loss signal selector that extracts individual signals obtained from multiple antennas from a single transmission line.

FIG. 1 depicts a radio system 100 for a motor vehicle, which uses a single coaxial cable transmission line 122 to carry signals from multiple different antennas 112, 114, 116 to multiple different radios 102, 108. The 100 system thus obviates the need for multiple transmission lines, i.e., a transmission line between each antenna and its corresponding radio frequency device.

The system 100 comprises a conventional cellular telephone transceiver 102. As is well known, vehicle-located cell phones often use a primary antenna and a secondary diversity antenna, the diversity antenna being added to overcome the signal fading caused by multipath signal interference. The transceiver 102 thus has an input antenna port 104 for a primary antenna and a second input port 106 for a secondary or backup antenna referred to herein as a diversity antenna. The diversity antenna is also known as a multiple-input and multiple-output antenna or MIMO antenna 114.

The system 100 also comprises a global positioning system receiver 108, well known in the art for providing location information to a navigation system. The GPS receiver 108 has an input port 110 for a corresponding GPS antenna 116. In an alternate embodiment, the system 100 includes conventional AM/FM broadcast band receivers and a corresponding antenna for those receivers.

As used herein, the terms "band" and "radio frequency band" refers to a radio frequency range between two defined limits. By way of example, in the United States, the AM broadcast band is between 540 kHz and 1600 kHz.; the FM band is between 88 Mhz. and 108 Mhz.

The cell phone 102 and GPS receiver 108 operate in different bands. They require antennas sized, shaped and configured to optimize the reception of signals in those bands.

In addition to the radios 102 and 108 themselves, the system 100 additionally comprises a primary cellular antenna 112, a cellular diversity/MIMO antenna 114 and a GPS receiver antenna 116. Each of the antennas, 112, 114 and 116 are sized, shaped and arranged for use in corresponding frequency bands used by the radios 102, 108. Stated another way, the cellular antennas 112 and 114 are of a size, shape and configuration to optimize the reception and transmission of signals in the frequency band(s) corresponding to cellular telephony communications. The GPS antenna 116 is typically much smaller but is nevertheless sized, shaped and arranged to optimize signals in the frequency bands used by the global positioning system.

In order to use a single transmission line between the multiple different antennas 112, 114 and 166 and the multiple different radios operating in multiple different bands, the GPS antenna 116 and the cellular diversity/MIMO antenna 114 are operatively coupled to a conventional signal combiner 118. As its name suggests, the combiner 118 combines signals received from multiple antennas at multiple input ports and provides those multiple signals to a single output port 120 of the combiner 118 attached to which is a single coaxial transmission line 122.

The transmission line 122 has a physical length that is adequate to extend between the output port 120 of the combiner 118 and an input port 130 of a conventional directional coupler 128. Stated another way, the cable 122 has a first end 124 connected to the combiner 118 and a second end 126 connected to the directional coupler 128.

The directional coupler 128 is considered herein to be a four-terminal device. A first terminal is connected to the transmission line 122. A second terminal 132 is connected to an electrical ground or reference potential 134 through an impedance-matching resistor 136. A third port, which is also a first output port 138, is connected to an input port 140 of a crossbar switch 142. Signals on the coaxial cable transmission line 122 are fed through the coupler 128 and are present at essentially the same amplitude as they are on the transmission line 122.

The crossbar switch 142 is a bi-lateral, bi-directional switch and is well-known to those of ordinary skill in the art. Its operation is analogous to a double-pole, double-throw switch in that it is able to connect two "signal" ports 143 and 144 to different input ports 140 and 141.

A second output 148 of the coupler 128 is connected to the input 150 of a band pass filter 152. The output 154 of the filter 152 is connected to an antenna input port 110 of the GPS receiver 108.

Those of ordinary skill in the art with knowledge of directional couplers know that the coupler 128 has a "coupling coefficient," perhaps best described as an attenuation factor by which the amplitude of an input signal will be reduced or attenuated at the second or tap connection output 148. By way of example, if the antenna coupler 128 depicted in FIG. 1 has a six DB coupling coefficient, i.e., a 6 dB loss, a signal input to the input port 130 at a power level of 0 dBm will be output from the tap output 148 at −6 dBm. The coupling coefficient of the directional coupler should not be so great that it reduces the magnitude of the signal output at the tap output port to be below the level that can be recovered by a radio frequency receiver to which the tap output 148 is connected.

An important feature of a directional coupler used in the invention disclosed and claimed herein is the ability of the coupler to "sample" all-frequency signals from the transmission line to the tap output 148. Such functionality enables coupler 128 to provide multiple different radios with signals on multiple different bands, all of which are carried on a signal transmission line 122. When the multiple frequency-band signals are provided to the tap output 148, a pass band filter 152 connected to the tap output attenuates all of the signals on the tap output 148 except those within the pass band of the filter 152.

Figure 2:
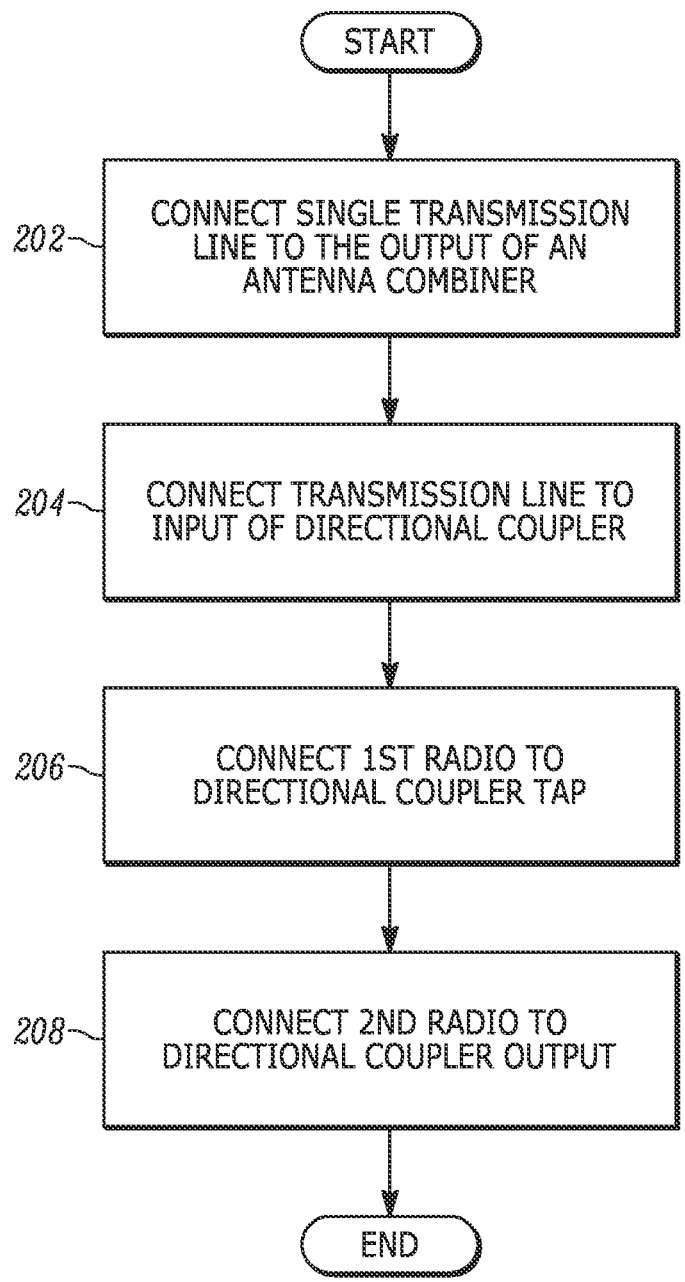
FIG. 2 is a flowchart depicting steps of a method for providing different radio signals from a single transmission line to a corresponding number of different radio frequency receivers.

The directional coupler 128 in combination with the band pass filter 152 comprises a low-loss signal selector. The ability of the coupler 128 to provide a reduced-amplitude copy of all signals travelling along the transmission line enables multiple different signals carried on the transmission line to be selectively recovered, one at a time, by different filter having different pass bands, the corresponding outputs of which are provided to a corresponding radio frequency device. In a preferred embodiment, signals received at an antenna for GPS signals are combined with signals received at an antenna for cellular signals Referring now to FIG. 2, a method of providing a plurality of different radio frequency signals on a single transmission line comprises a first step of connecting a single transmission line to the output of an antenna combiner, such as the combiner 118 depicted in FIG. 1. At a second step 204, the transmission line is connected to the input terminal of a directional coupler, such as the coupler 128 depicted in FIG. 2.

At step 206, a radio is connected to one of the output ports, typically the output port 138 but alternatively the output tap 148. Finally, at step 208 a second radio is connected to the other output. As described above, a filter at the output of the tap coupler connection provides only signals of the particular frequency at the end of interest to the corresponding radio.

Those of ordinary skill in the art will recognize that the method and apparatus described above can be used to couple multiple antennas to multiple different radio devices via a single transmission line. By way of example, the three different antennas required by a commercial AM and FM broadcast radio, cellular telephone and GPS can be coupled to the corresponding radios via a single coaxial cable transmission line using the apparatus and method described above.

The foregoing description is for purposes of illustration only. The true scope of the invention is set forth in the following claims.

What is claimed is:

1. Apparatus comprising:
a low-loss signal selector, configured to extract a Global Positioning System ("GPS") signal from a single transmission line carrying a GPS signal in a first radio frequency band combined with a cellular diversity/MIMO signal in a second radio frequency band, the GPS signal being obtained from a GPS antenna that is sized, shaped, and arranged for signals in the first radio frequency band and the cellular diversity/MIMO signal being obtained from a diversity/MIMO antenna that is sized, shaped, and arranged for the second frequency band, the low-loss signal selector comprising:
a directional radio frequency coupler having an input port coupled to said single transmission line, a first output port coupled to a first radio frequency receiver device and a second output port, the second output port providing transmission line signals that are attenuated by a coupling coefficient of the directional radio frequency coupler; and
a first bandpass filter having a first pass band corresponding to the GPS signal to be extracted from the plurality of different frequency signals, the first bandpass filter having an input port coupled to the second output port of the directional radio frequency coupler and having an output port coupled to a second radio frequency receiver, the second radio frequency receiver being configured to demodulate the GPS signal.

2. The apparatus of claim 1, further comprising a second bandpass filter having a second pass band, a corresponding input port coupled to the second output port and a corresponding output port coupled to a third radio frequency receiver, the third radio frequency receiver being configured to operate on signals within said second pass band.

3. The apparatus of claim 1, wherein the directional coupler is configured to have a predetermined coupling coefficient, selected such that the amplitude of signals output from the second output port is at least recoverable by a radio frequency receiver coupled thereto.

4. The apparatus of claim 1, wherein the directional coupler is configured to have a predetermined coupling coefficient, selected such that the amplitude of signals output from the second output port is recoverable by each radio frequency receiver of a plurality of receivers coupled thereto.

5. A radio system for a motor vehicle, the system comprising:
a cellular transceiver comprising a receiver having a cellular primary antenna input port and a cellular diversity/MIMO input port, the cellular transceiver being configured to operate in a first frequency band;
a global positioning system (GPS) receiver having a GPS antenna input port, the GPS receiver operating in a second frequency band;
a primary cellular antenna attached to the motor vehicle, the primary cellular antenna being sized, shaped and arranged for the first frequency band;
a diversity/MIMO antenna attached to the motor vehicle, the diversity/MIMO antenna being sized, shaped and arranged for the first frequency band;
a GPS antenna attached to the motor vehicle and being sized, shaped and arranged for the second frequency band;
a combiner having a first input coupled to the GPS antenna and a second input coupled to the diversity/MIMO antenna, the combiner being configured to couple signals from the inputs to a single output;
a directional coupler having an input port, a first output port and a second output port;
a single transmission line having a first end coupled to single output of the combiner and having an opposing second end coupled to the input port of the directional coupler;
a cross bar switch configured to selectively couple one of the cellular primary antenna input port and the cellular diversity/MIMO input port to one of the first output port of the directional coupler and the primary cellular antenna; and
a bandpass filter coupled between the GPS receiver and the second output port of the directional coupler;
wherein GPS signals in the second frequency band and collected by the GPS antenna are selectively provided to the GPS receiver, and cell phone signals in the first frequency band from one of the primary cellular antenna and the diversity/MIMO antenna are selectively provided to one of the cellular primary antenna input port and the cellular diversity/MIMO input port.

6. The radio system of claim 5, wherein the directional coupler is configured to have a predetermined coupling coefficient, selected such that the amplitude of signals output from the second output port of the directional coupler is recoverable by a radio frequency receiver coupled thereto.

7. The radio system of claim 5, wherein the cellular transceiver and GPS receiver are within a motor vehicle and wherein the primary cellular antenna, the diversity/MIMO antenna and the GPS antenna are separate antennas, each of which is attached to the motor vehicle.

8. A method of providing a plurality of different radio frequency signals carried on a single transmission line, which are in a corresponding plurality of different radio frequency bands, to a corresponding plurality of different radio frequency receivers, the method comprising:

connecting the single transmission line carrying the plurality of different radio frequency signals to an input of a directional coupler having a plurality of outputs;

connecting a first radio frequency receiver for a first radio frequency band to a first output of the directional coupler;

connecting a second radio frequency receiver for a second radio frequency band to a second output of the directional coupler;

connecting a first band pass filter between the second radio frequency receiver and the second output of the directional coupler;

wherein the different radio frequency signals include a Global Positioning System ("GPS") signal from a GPS antenna; and wherein the different radio frequency signals include a cellular diversity signal from a cellular diversity antenna.

9. The method of claim 8, wherein the first band pass filter is configured to pass the GPS signal from the second output of the directional coupler to the GPS antenna.

* * * * *